United States Patent [19]
Hwang

[11] Patent Number: 5,952,415
[45] Date of Patent: Sep. 14, 1999

[54] GOLF BALL

[75] Inventor: In Hong Hwang, Seoul, Rep. of Korea

[73] Assignee: Woohak Leispia Inc., Cheong Buk-Do, Rep. of Korea

[21] Appl. No.: 08/835,766

[22] Filed: Apr. 8, 1997

[30] Foreign Application Priority Data

Dec. 26, 1996 [KR] Rep. of Korea ............... 96-72317

[51] Int. Cl.$^6$ ............... A63B 37/06; A63B 37/12
[52] U.S. Cl. ............... 524/399; 473/372; 473/373
[58] Field of Search ............... 473/372, 373; 524/399

[56] References Cited

U.S. PATENT DOCUMENTS 4,056,269 11/1977 Pollitt ............... 524/432
5,508,350 4/1996 Cadorniga ............... 473/372

*Primary Examiner*—David Buttner
*Attorney, Agent, or Firm*—Amster, Rothstein & Ebenstein

[57] ABSTRACT

A solid golf ball with core and cover covering the said core, except outer cover, made in compositions of a mixture of α,β-ethylenical unsaturated carboxylic acid and fatty acid bismuth salt in amounts of 3–25 and 5–50 parts by weight respectively per 100 parts by weight of the base resins of the said golf ball, which has a good spin property by a softness and the carry can be extended in comparison with other golf balls made in a common composition. Since it can be applied selectively to each part, it is possible to make the golf balls with various properties that may give a satisfaction to all sorts of golfers.

20 Claims, 1 Drawing Sheet

2-piece solid Golf Ball 3-piece solid Golf Ball 3-piece solid Golf Ball 4-piece solid Golf Ball 4-piece solid Golf Ball

GOLF BALL

FIELD OF THE INVENTION

The present invention refers to a golf ball in which α,β-ethylenical unsaturated carboxylic acid and fatty acid bismuth salt are added to the compositions of organic polymeric materials, thereby to produce a higher coefficient of resilience while retaining its spin property, so it has a more extended carry than common golf balls.

BACKGROUND OF THE INVENTION

The most important things in various properties of a golf ball are good repelling elasticity, long carry and proper spin which can be easily adjustable, but, it is usual that common golf balls with long carry become worse in the spin property thereof or in the other way. Thus, the present invention is to solve the problems and provide a golf ball which has a higher resilience than common golf balls and a good property of spin by adding fatty acid bismuth salt with α,β-ethylenical unsaturated carboxylic acid in the compositions of organic polymeric materials of the golf ball.

DESCRIPTION OF THE MAIN PARTS IN DRAWINGS

Figure 1:
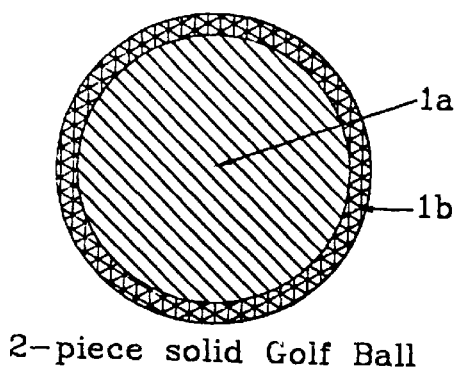
FIG. 1 is a sectional view of Two Piece Solid Golf Ball with one cover covering one core according to the present invention.

In FIG. 1 1a is core, 1b is cover.

Figure 2:
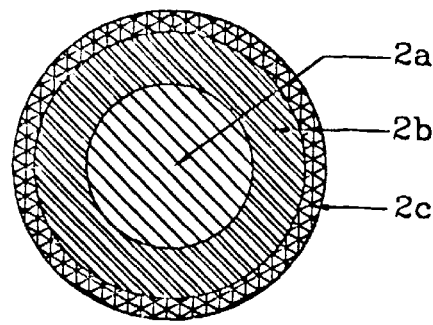
FIG. 2 is a sectional view of Three Piece Solid Golf Ball with dual core and one cover according to the present invention.

In FIG. 2 2a is inner core, 2b is outer layer, 2c is cover.

Figure 3:
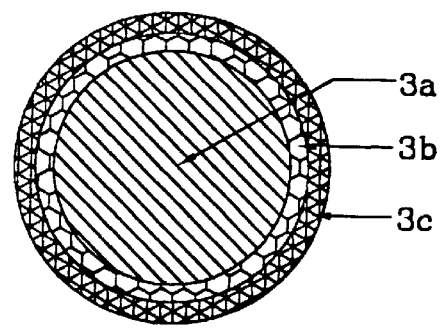
FIG. 3 is a sectional view of Three Piece Solid Golf Ball with one core and double cover according to the present invention.

In FIG. 3 3a is core, 3b is inner cover, 3c is outer cover.

Figure 4:
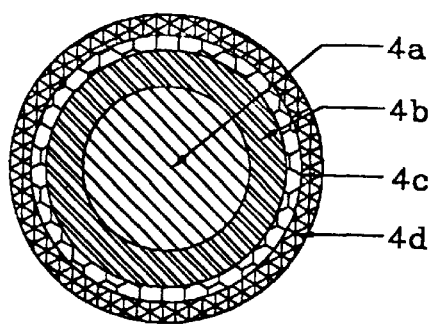
FIG. 4 is a sectional view of Four Piece Solid Golf Ball with dual core and double cover according to the present invention.

In FIG. 4 4a is inner core, 4b is outer layer, 4c is inner cover, 4d is outer cover.

Figure 5:
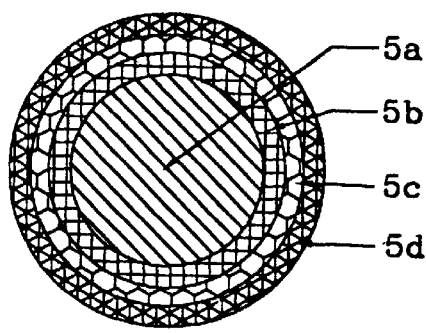
FIG. 5 is a sectional view of Four Piece Solid Golf Ball with one core and triple cover according to the present invention.

In FIG. 5 5a is core, 5b is inner cover, 5c is middle cover, 5d is outer cover.

DETAILED DESCRIPTION OF THE INVENTION

Firstly, the main materials for the core (designating respectively core 1a in FIG. 1, inner core 2a and outer layer 2b in FIG. 2, core 3a in FIG. 3, inner core 4a and outer layer 4b in FIG. 4 and core 5a in FIG. 5), hereinafter "core," may be rubbers, co-crosslinking agents including α,β-ethylenical unsaturated carboxylic acid, filler, fatty acid bismuth salt, anti-oxidant and reacting initiator. Rubber good for use is cis-1,4 polybutadiene and, in some cases, other rubbers such as isoprene rubber, natural rubber and S.B.R. can be used in a mixture. Meanwhile, α,β-ethylenical unsaturated carboxylic acid, one of the points of the present invention, is used as a co-crosslinking agent and reacting activator. In some cases, its metallic salts and esters of unsaturated carboxylic acid such as trimethylol propane trimethacrylate, trimethylol propane triacrylate, urethane acrylate and epoxy acrylate can be used in a proper mixture. α,β-ethylenical unsaturated carboxylic acid good for use is acrylic acid or methacrylic acid, which is blended in amounts of 3–25 parts by weight per 100 parts by weight of the base rubbers, if necessary, the metallic salts thereof such as zinc diacrylate, zinc dimethacrylate and other esters of unsaturated carboxylic acid as an additional co-crosslinking agent can be used in amounts of 1–15 parts by weight per 100 parts by weight of the base rubbers.

As a filler, metallic oxides such as zinc oxide, lead oxide and iron oxide and various inorganics such as barium sulfate, silica, calcium carbonate and glass fiber are used. If using acrylic acid, methacrylic acid, zinc diacrylate and zinc dimethacrylate as a co-crosslinking agent, zinc oxide is good in particular and can be used in mixture with other specific fillers. The quantity of filler to use, which is fixed in due consideration of the specific gravity and hardness of each core, is not limited in general. It is practically used in amounts of 1–30 parts by weight per 100 parts by weight of the base rubbers. As anti-oxidant, 2,2'-Methylene Bis(4-ethyl-6-tert.-butyl phenol) is commonly used, the quantity being 0.5–1.5 parts by weight per 100 parts by weight of the base rubbers. As a reacting initiator, organic peroxides such as Dicumyl peroxide, n-Butyl-4,4'-Bis(t-butyl peroxy) valerate, Bis(t-butyl peroxy isopropyl) benzene, 1,1'-Bis(t-butyl peroxy)-3,3,5-trimethyl cyclohexane, etc. are commonly used. This reacting initiator is used in amounts of 0.5–5 parts by weight per 100 parts by weight of the base rubbers and, if need be, an auxiliary coagent of reacting initiator like N,N-m-phenylene dimaleimide can be used as a coagent.

Meanwhile fatty acid bismuth salt, one of the points of the present invention, is used in crystal or powder form made by adding a solution of bismuth nitrate with a molecular formula of $Bi(NO_3)_3$ to a water solution of alkali soap of fatty acid and precipitating it through double decomposition or by heating and melting free fatty acid and bismuth nitrate. Fatty acids, the main materials to make fatty acid bismuth salt, are palmitic acid with a molecular formula of $CH_3(CH_2)_{14}COOH$, stearic acid with a molecular formula of $CH_3(CH_2)_{16}COOH$ and oleic acid with a molecular formula of $CH_3(CH_2)_7CH=CH(CH_2)_7COOH$, and combine with bismuth mostly to form a trivalent salt of bismuth. Fatty acid bismuth salts having a state of trivalent bismuth are bismuth palmitate with a molecular formula of $Bi(C_{15}H_{31}COO)_3$, bismuth stearate with a molecular formula of $Bi(C_{17}H_{35}COO)_3$ and bismuth oleate with a molecular formula of $Bi(C_{17}H_{33}COO)_3$. The crystal or powder of fatty acid bismuth salt, re-pulverized to powdery grain passable through 200 to 300-mesh sieve, is practically used. This fatty acid bismuth salt is used in amounts of 5–50 parts by weight per 100 parts by weight of the base rubbers.

For making the aforesaid core according to the present invention, it is necessary to go through the process of mixing well the referred materials with a common mixing instrument such as Kneader, Banbury mixer, Two-roll mill, etc., especially in due orders of mixing well the base rubber with an anti-oxidant for some 5 min. and adding fatty acid bismuth salt to the mixture and mixing them for more than 10 min., so that this fatty acid bismuth salt can melt and permeate the rubber materials under some frictional heat. After that, one adds the α,β-ethylenical unsaturated carboxylic acid thereto little by little and mixes well them all for more than 15 min. And, if need be, other cross linking agent and filler can be added, and the mixture can be completed by adding a reacting initiator, which organic peroxide is to be well mixed therewith the last time. After mixing as above, it is required to make the mixture into a specific size with a suitable instrument, e.g., a mold with this mixture and performing molding under specified time, pressure and temperature. There are several molding methods such as compression molding, Injection molding or others, among which Compression molding or Injection molding is proper for the preferred embodiment.

In molding a core, it is usual to combine the rubber and co-crosslinking agent by heat and reacting initiator and then, it properly adjusting the temperature condition, fatty acid bismuth salt which is affected by heat and $\alpha,\beta$-ethylenical unsaturated carboxylic acid (which evaporates in part and gets decomposed into fatty acid and bismuth) are added. It is at this time that fatty acid rapidly melts and permeates rubber molecules and that bismuth in unsaturated carboxylic acid by a reversible reaction crosslinks with the rubber materials. The crosslinking is commonly performed in a matrix centering on bismuth under fusion of which matrix, the volume gets smaller than it would be at the normal temperature, while organic polymeric materials like rubber rapidly expand in the same volume as bismuth shrinks. But this expansion to larger than the size of mold can be prevented by applying higher pressure to the mold. And cooling of the molding causes the expanded rubbers to reshrink and their molecules densify accordingly. The molding becomes softer and has higher repelling elasticity than other moldings in common compositions do, because the hardened rubber, by crosslinking reaction, grows more flexible by the fatty acid and expands bismuth (which has as a distinguished property that its volume expansion is 3–3.5% in solidifying). The center of the matrix structure becomes solidified while cooling the molding, with the result that it gets the molecular structure of polymeric materials around the bismuth dense again to make a core holding a lot of energy. The golf ball with the core according to this invention, holding further energy than other common golf balls do, can make its carry much farther than other common balls. Additionally, with the core it is possible to make a soft golf ball which is agreeable to the touch and has a good spin property.

In case of applying the cores as described above to a golf ball, the 3-piece solid golf ball in FIG. 2 can be made with all inner core(2a) and outer layer(2b) of dual core or with inner core(2a) in common compositions and outer layer(2b) in compositions according to the present invention or, in some cases, with inner core(2a) in compositions according to this invention and outer layer(2b) in common compositions. The 4-piece solid golf ball in FIG. 4 also can be made with all inner core(4a) and outer layer(4b) of dual core having bismuth or with inner core(4a) in common compositions and outer layer(4b) in compositions according to the present invention or, in some cases, with inner core(4a) in compositions according to this invention and outer layer(4b) in common compositions.

Meanwhile, the cover according to the present invention is applicable to all inner covers(inner cover 3b in FIG. 3, inner cover 4c in FIG. 4 and inner cover 5b and middle cover 5c in FIG. 5, hereinafter referred to as "cover" except outer covers of golf balls shown in the aforementioned figures because there easily occurs the yellowing if applying the compositions according to this invention to an outer cover (in case of a white golf ball, its outer cover gets light greyish yellowing) with the result that value of goods may be lowered. As the main materials for making the cover of present invention are organic polymeric materials such as ionomer resin, rubber and other thermoplastic resins, used alone or in a mixture of more than two kinds, and white pigments to whiten, fillers, etc. An $\alpha,\beta$-ethylenical unsaturated carboxylic acid and fatty acid bismuth salt (which are the point of the present invention) are practically used together.

Ionomer resin as a main material is the one that unsaturated mono- or di-carboxylic acid having 3 to 8 carbon atoms in mono-olefin and matters having some ester thereof are partly or all neutralized by mono- or di-valent metals. (Some unsaturated mono- or di-carboxylic acid being materials such as $\alpha,\beta$-ethylenical unsaturated carboxylic acid which is used in the present invention also may be included). At present, a ionomer resin named SURLYN of Dupon't, is in most general use for golf ball cover. There are many resins with various properties according to the constituent molecules, reactions and the molecular weights in making ionomer resin. Metals used in neutralizing any differences in neutralization are on the market, among which the one with Shore D Hardness 35–70 and Flexural Modulus 250–600 MPa is proper for the present invention. This ionomer resin may be used alone or as a mixture of more than two kinds thereof. Rubbers, the main materials for inner cover, such as trans-isoprene or polybutadiene, can be used alone or in a mixture of more than two kinds thereof. Each resin material stated above may be used alone or in a proper mixture of various resins. As a white pigment, titanium dioxide is proper for use and may be mixed with barium sulfate if need be. It is notable to use them in amounts of 2–5 parts by weight per 100 parts by weight of the base resins for the inner cover. And, some blue pigments, violet-like pigments or whiteness increasing agent can be added for whitening further. In some cases, heavy metals or metallic oxides as a filler to weight the inner cover can be used in amounts of 5–50 parts by weight per 100 parts by weight of the base resins. On the other hand, $\alpha,\beta$-ethylenical unsaturated carboxylic acid, one of the points of the present invention, is practically used in amounts of 3–25 parts by weight per 100 parts by weight of the base resins. Also fatty acid bismuth salt, one of the points of this invention, is the same thing as described earlier in the parts hereof about the core and is used in amounts of 5–50 parts by weight per 100 parts by weight of the base resins. For making the inner cover according to the present invention, it is necessary to mix well the compositions as described earlier for the core. As an ionomer resins, first, it is necessary to complete melting the fixed quantity of fatty acid bismuth salt which is mixing with the base resins in an extruder at about 200° C. and to make the mixture into a proper sized pellets. And after, immediately coating the pellets of mixed fatty acid bismuth salt and ionomer resin in a proper mixer with the mixture of $\alpha,\beta$-ethylenical unsaturated carboxylic acid, pigments and other powdery fillers already prepared, to melt and react in the aforementioned extruder and then form proper sized pellets. The mixture made as above is to cover the aforementioned core by Injection molding or compression molding. Meanwhile, rubbers, unlike ionomer resins, demand mixing the compositions by the same methods as making the core and covering the core with the aforementioned mixture by Injection molding or compression molding. But, in case of covering a middle cover, it is desirable to shorten hardening time of the inner cover, so that the adhesion to each other and full hardening may occur during covering of the middle cover. When making the inner cover there occurs the same phenomenon as described earlier in the parts about the core according to the present invention, while $\alpha,\beta$-ethylenical unsaturated carboxylic acid crosslinks with molecules of ethylene and improves elasticity, then, with the result the that ionomer resin grows harder than it was by nature. But, fatty acid separated from fatty acid bismuth salt permeates molecules of hardened resin, which causes the resin to be denser and softer than it was by nature. Additionally, free separated bismuth, after cooling of moldings, gets solidified and expanded in volume, with the result that the polymeric materials grow dense as much as bismuth expands and hold a lot of energy. Meantime, in case of rubbers, as described earlier in the parts hereof about the core, the rubber hardened by crosslinking of α,β-ethylenical unsaturated carboxylic acid grows more flexible via the fatty acid and bismuth center of matrix structure, solidifies and expands in volume, with the result that the molecular structure of polymeric materials around the bismuth grows dense again as much as the bismuth expands to make an inner cover with much further energy. In the case where the inner covers according to the present invention are applied to a golf ball, the golf ball having a double inner cover, as illustrated in FIG. 5, can be made with all inner cover(5b) and middle cover(5c) in composition of this invention or with inner cover(5b) in composition of this invention and middle cover(5c) in common composition or, in some cases, with inner cover (5b) in common composition and middle cover(3f) in composition of this invention.

Meanwhile, for making the outer cover of present invention, the same organic polymeric matters as used for inner covers described earlier is mainly used as the base resins, and other common organic polymeric materials for the outer cover all can be used in addition thereto. For examples, there are polyurethane resin, thermoplastic polyether-ester resin, other thermoplastic resins, etc. And, pigments for whitening, some whiteness increasing agents and other various additives may be used. With these compositions of the outer cover, the cores or inner covers according to the present invention are covered by the common molding methods.

In a golf ball in a composition according to the present invention as mentioned above, though using the same organic polymeric materials as other common golf balls do, organic polymeric matters become dense between their molecules to hold a lot of energy and yet are soft to the touch, unlike other common golf balls, so that the golf ball can make its carry farther and have a good spin property because of its softness. Furthermore, it is possible to make a golf ball with a core in a composition according to the present invention and a cover in common composition, in a the other way, or with an inner cover in composition according to this invention and a core in common composition. Additionally, if varying the way to apply the composition according to the present invention to each part of a multilayer golf ball such as 3-piece solid golf ball and 4-piece solid golf ball, its effects also become diversified, so that it can be practicable to make a golf ball with various properties.

EXAMPLES

The following Examples and Comparative Examples further illustrate the present invention in detail but are not to be construed to limit the scope thereof.

Examples 1–5 and Comparative Examples 1–5
Core Making

After mixing well the compositions shown on Table 1 by the same method as described in the parts about core and milling the mixture finely by a two-roll mill, and make it in a proper size in a preformer, it is needed to heat in a mold at 170° C. for 15 min. and harden it, so as to make each inner core in FIG. 2 and FIG. 4. And, after covering the inner core with the outer layer made in a proper sized mixture which is milled in the compositions as shown on Table 1, heat again at 170° C. for 15 min. and harden it, so as to make the dual core in FIG. 2 and FIG. 4. Meanwhile, the core in FIG. 1, FIG. 3 and FIG. 5 can be made by heating the compositions shown on Table 1 in a mold at 170° C. for 20 min. and hardening it, in the same way as above.

Cover and Golf Ball Making

After mixing well the compositions shown on Table 1 by the same method as described in the parts about inner cover, it is needed to pre-dry pellets of the mixture in a dryer at 60° C. for 20 hours and covering the prepared core by using a injection molding machine, so as to make a golf ball in FIG. 1. And, in the same way as above, a golf ball in FIG. 2 can be made by covering the dual core prepared earlier with pellets of the mixture of compositions shown on Table 1 by using a injection molding machine. A golf ball in FIG. 3 or FIG. 4 also can be made by covering the core or dual core prepared in the mixture of compositions shown on Table 1 with the inner cover, and with the outer cover over this inner cover by using a injection molding machine. Additionally, a golf ball with triple cover in FIG. 5 can be made by covering successively with the mixture shown on Table 1 in the same way. It is notable that all the mixture quantity of the referred compositions shown on Table 1 are the parts by weight.

Meanwhile, a golf ball with the compositions shown on Table 2 is made as a comparative examples to appraise comparatively in the same method as the aforesaid examples. All the mixture quantity of the referred compositions are the parts by weight.

Additionally, there are seen on Table 3 the result of comparative appraisal as the characters of golf balls from examples of Table 1 and comparative examples of Table 2. It is notable that, by adding a filler to the cores on Table 2 to get the weight of all golf balls similar to that on Table 1.

TABLE 1

|  | Mixture | (Examples) | | | | |
| --- | --- | --- | --- | --- | --- | --- |
|  |  | 1 | 2 | 3 | 4 | 5 |
| Inner core (Core) | Cis-1,4-polybutadiene rubber | 100 | 100 | 100 | 100 | 100 |
|  | 2,2'-methylene bis (4-ethyl-6-t-butyl phenol) | 0.5 | 0.5 | 0.5 | 0.5 | 0.5 |
|  | Zinc oxide | 5.0 | 5.0 | 5.0 | 5.0 | 5.0 |
|  | Acrylic acid | 19.5 | 20.0 | 19.0 | 15.5 | 19.5 |
|  | Zinc diacrylate | 5.0 |  |  | 9.8 |  |
|  | Bismuth stearate | 25.5 | 26.5 | 24.5 | 20.0 | 25.5 |
|  | Dicumyl peroxide (40%) | 3.0 | 3.0 | 3.0 | 3.0 | 3.0 |

TABLE 1-continued

|  |  | (Examples) | | | | |
|---|---|---|---|---|---|---|
|  | Mixture | 1 | 2 | 3 | 4 | 5 |
| Outer layer | Cis-1,4-polybutadiene rubber |  | 100 |  | 100 |  |
|  | 2,2'-methylene bis (4-ethyl-6-t-butyl phenol) |  | 0.5 |  | 0.5 |  |
|  | Zinc oxide |  | 5.0 |  | 5.0 |  |
|  | Acrylic acid |  | 15.8 |  | 14.3 |  |
|  | Zinc diacrylate |  | 3.0 |  | 5.5 |  |
|  | Bismuth stearate |  | 19.7 |  | 17.0 |  |
|  | Dicumyl Peroxide (40%) |  | 3.0 |  | 3.0 |  |
| Inner cover | Surlyn#9970 (Brand name of ionomer resin) |  |  | 50.0 | 50.0 | 50.0 |
|  | Surlyn#8320 (Brand name of ionomer resin) |  |  | 50.0 | 50.0 | 50.0 |
|  | Titanium dioxide (Rutile type) |  |  | 3.0 | 3.0 | 3.0 |
|  | Methacrylic acid |  |  | 8.5 |  | 8.0 |
|  | Acrylic acid |  |  |  | 8.0 |  |
|  | Bismuth stearate |  |  | 13.0 | 12.0 | 12.0 |
| Middle cover | Surlyn#9970 (Brand name of ionomer resin) |  |  |  |  | 50.0 |
|  | Surlyn#8320 (Brand name of ionomer resin) |  |  |  |  | 50.0 |
|  | Titanium dioxide (Rutile type) |  |  |  |  | 3.0 |
|  | Methacrylic acid |  |  |  |  | 9.0 |
|  | Bismuth stearate |  |  |  |  | 14.0 |
| Outer cover | Surlyn#8940 (Brand name of ionomer resin) | 50.0 | 50.0 | 50.0 | 50.0 | 50.0 |
|  | Surlyn#9910 (Brand name of ionomer resin) | 50.0 | 50.0 | 50.0 | 50.0 | 50.0 |
|  | Titanium dioxide (Rutile type) | 3.0 | 3.0 | 3.0 | 3.0 | 3.0 |

TABLE 2

|  |  | (Comparative Examples) | | | | |
|---|---|---|---|---|---|---|
|  | Mixture | 1 | 2 | 3 | 4 | 5 |
| Inner core (Core) | Cis-1,4-polybutadiene rubber | 100 | 100 | 100 | 100 | 100 |
|  | 2,2'-methylene bis (4-ethyl-6-t-butyl phenol) | 0.5 | 0.5 | 0.5 | 0.5 | 0.5 |
|  | Zinc oxide | 17.0 | 5.0 | 17.0 | 11.0 | 5.0 |
|  | Zinc diacrylate | 32.0 | 33.0 | 31.5 | 32.5 | 31.5 |
|  | Dicuml peroxide (40%) | 3.0 | 3.0 | 3.0 | 3.0 | 3.0 |
| Outer layer | Cis-1,4-polybutadiene rubber |  | 100 |  | 100 |  |
|  | 2,2'-methylene bis (4-ethyl-6-t-butyl phenol) |  | 0.5 |  | 0.5 |  |
|  | Zinc oxide |  | 21.0 |  | 13.0 |  |
|  | Zinc diacrylate |  | 29.0 |  | 29.5 |  |
|  | Dicumyl Peroxide (40%) |  | 3.0 |  | 3.0 |  |
| Inner cover | Surlyn#9970 (Brand name of ionomer resin) |  |  | 50.0 | 50.0 | 50.0 |
|  | Surlyn#8320 (Brand name of ionomer resin) |  |  | 50.0 | 50.0 | 50.0 |
|  | Titanium dioxide (Rutile type) |  |  | 3.0 | 3.0 | 3.0 |
|  | Zinc oxide |  |  | 5.0 | 6.0 | 6.0 |
| Middle cover | Surlyn#9970 (Brand name of ionomer resin) |  |  |  |  | 50.0 |
|  | Surlyn#8320 (Brand name of ionomer resin) |  |  |  |  | 50.0 |
|  | Titanium dioxide (Rutile type) |  |  |  |  | 3.0 |
|  | Zinc oxide |  |  |  |  | 7.0 |
| Outer cover | Surlyn#8940 (Brand name of ionomer resin) | 50.0 | 50.0 | 50.0 | 50.0 | 50.0 |
|  | Surlyn#9910 (Brand name of ionomer resin) | 50.0 | 50.0 | 50.0 | 50.0 | 50.0 |
|  | Titanium dioxide (Rutile type) | 3.0 | 3.0 | 3.0 | 3.0 | 3.0 |

TABLE 3

|  | (Comparative appraisal of properties) | | | | | | | | | | |
|---|---|---|---|---|---|---|---|---|---|---|---|
|  |  | Examples | | | | | Comparative Examples | | | | |
|  |  | 1 | 2 | 3 | 4 | 5 | 1 | 2 | 3 | 4 | 5 |
| Diameter of inner core (mm) |  |  | 29.8 |  | 29.8 |  |  | 29.8 |  | 29.8 |  |
| Diameter of Core(Outer layer) (mm) |  | 39.4 | 39.4 | 36.7 | 37.3 | 35.0 | 39.4 | 39.4 | 36.7 | 37.3 | 35.0 |
| Diameter of inner cover (mm) |  |  |  | 39.7 | 39.9 | 37.5 |  |  | 39.7 | 39.9 | 37.5 |
| Diameter of Middle cover (mm) |  |  |  |  |  | 40.0 |  |  |  |  | 40.0 |
| Diameter of Outer cover(Cover)(mm) |  | 42.7 | 42.7 | 42.7 | 42.7 | 42.7 | 42.7 | 42.7 | 42.7 | 42.7 | 42.7 |
| ATTI Compression of Golf ball | (*1) | 92 | 87 | 93 | 94 | 101 | 97 | 92 | 95 | 101 | 107 |
| Shore D hardness of Core surface | (*2) | 44 | 42 | 43 | 41 | 43 | 44 | 43 | 44 | 43 | 44 |
| Shore D hardness of Outer cover surface | (*3) | 64 | 64 | 64 | 64 | 64 | 64 | 64 | 64 | 64 | 64 |
| Initial velocity (ft/sec) | (*4) | 254 | 254 | 253 | 254 | 254 | 253 | 254 | 253 | 253 | 254 |
| Initial spin of Iron #5 (rpm) | (*5) | 6080 | 6230 | 5970 | 5990 | 5760 | 5870 | 6120 | 5880 | 5910 | 5650 |

TABLE 3-continued

|  |  | (Comparative appraisal of properties) | | | | | | | | |
|---|---|---|---|---|---|---|---|---|---|---|
|  |  | Examples | | | | | Comparative Examples | | | |
|  |  | 1 | 2 | 3 | 4 | 5 | 1 | 2 | 3 | 4 | 5 |
| Carry of Driver #1 (yard) | (*6) | 222 | 220 | 223 | 225 | 220 | 219 | 217 | 218 | 221 | 216 |
| Hit Feeling | (*7) | ⊙ | ⊙ | ○ | ○ | Δ | ○ | ○ | Δ | Δ | × |

(*1) Numeric values obtained with Compressive Strength Tester made by ATTI Co. in U.S.A., showing a compression strength of the golf balls, that the higher valued one is relatively harder.
(*2) Test method of German Industrial Standard DIN 53505 with a Hardness Measuring Instrument made by Zwick Co. in Germany, measuring a hardness of outer surface of the core (dual core), that the higher valued one is relatively with a high hardness.
(*3) Same method and instrument as used in (*2), measuring the hardness of outer cover surface of the golf balls.
(*4) Initial velocity of the golf balls just hitting at a head speed of 143.8 ft/sec. with a driver in 10.5° loft angle of IRON BYRON(brand name), mechanical golfer made by True Temper Sports Co. in U.S.A..
(*5) Values calculated in terms of RPM(Revolution Per Minute) through Test photographing the revolution of the golf balls just hitting at a head speed of 130 ft/sec. with #5 Iron in 30° loft angle of the same mechanical golfer as stated in (*4).
(*6) Carry of the golf balls just hitted at a head speed of 143.8 ft/sec. with a driver in 10.5° loft angle of the same mechanical golfer as stated in (*4).
(*7) Appraisal of the golf balls through the golfers with average less than 80 who have practically rounded the course, which represents as ⊙Excellent ○Good ΔNormal ×Bad As shown on Table 3, the golf ball using α,β-ethylenical unsaturated carboxylic acid and fatty acid bismuth salt according to the present invention is the superior one with its soft feel and a carry which can be extended, in comparison with other golf balls, though both are made by use of the same organic polymeric materials.

What is claimed is:

1. Two-piece solid golf ball with a core 1a and a cover 1b covering the said core 1a, the said core 1a being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

2. Three-piece solid golf ball with an inner core 2a, an outer layer 2b covering the said inner core 2a to define a dual core, and a cover 2c covering the said dual core, the said inner core 2a being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

3. Three-piece solid golf ball with an inner core 2a, an outer layer 2b covering the said inner core 2a to define a dual core, and a cover 2c covering the said dual core, the said outer layer 2b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

4. Three-piece solid golf ball with an inner core 2a, an outer layer 2b covering the said inner core 2a to define a dull core, and a cover 2c covering the said dual core, each of the said inner core 2a and outer layer 2b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

5. Three-piece solid golf ball with a core 3a, an inner cover 3b covering the said core 3a, and an outer cover 3c covering the said inner cover 3b, the said core 3a being a mixture of base resins, α,β-ethylenical unsaturated corboxylic acid, and fatty acid bismuth salt, the said acid and salt being present initially in amounts of 3–25 and 5–50 parts by weight respectively per 100 parts by weight of the said base resins.

6. Three-piece solid golf ball with a core 3a, an inner cover 3b covering the said core 3a, and an outer cover 3c covering the said inner cover 3b, the said inner cover 3b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

7. Three-piece solid golf ball with a core 3a, an inner cover 3b covering the said core 3a, and an outer cover 3c covering the said inner cover 3b, each of the said core 3a and inner cover 3b being a mixture of base resins, α,β-ethylenical unsaturated carboxylic acid, and fatty acid bismuth salt, the said acid and silt being present initially in amounts of 3–25 and 5–50 parts by weight respectively per 100 parts by weight of the said base resins.

8. Four-piece solid golf ball with an inner core 4a, an outer layer 4b covering the said inner core 4a to define a dual core, an inner cover 4c covering the said dual core, and an outer cover 4d covering the said inner cover 4c, the said inner core 4a being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

9. Four-piece solid golf ball with an inner core 4a, an outer layer 4b covering the said inner core 4a to define a dual core, an inner cover 4c covering the said dual core, and an outer cover 4d covering the said inner cover 4c, each of the said inner core 4a and outer layer 4b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

10. Four-piece solid golf ball with an inner core 4a, an outer layer 4b covering the said inner core 4a to define a dual core, an inner cover 4c covering the said dual core, and an outer cover 4d covering the said inner cover 4c, each of the said inner core 4a, outer layer 4b and inner cover 4c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

11. Four-piece solid golf ball with an inner core 4a, an outer layer 4b covering the said inner core 4a to define a dual core, an inner cover 4c covering the said dual core, and an outer cover 4d covering the said inner cover 4c, the said outer layer 4b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resin.

12. Four-piece solid golf ball with an inner core 4a, an outer layer 4b covering the said inner core 4a to define a dual core, an inner cover 4c covering the said dual core, and an outer cover 4d covering the said inner cover 4c, each of the said outer layer 4b and inner cover 4c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

13. Four-piece solid golf ball with an inner core 4a, an outer layer 4b covering the said inner core 4a to define a dual core, an inner cover 4c covering the said dual core, and an outer cover 4d covering the said inner cover 4c, the said 4c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

14. Four-piece solid golf ball with a core 5a, an inner cover 5b covering the said core 5a, a middle cover 5c covering the said inner cover 5b, and an outer cover 5d covering the said middle cover 5c, the said core 5a being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

15. Four-piece solid golf ball with a core 5a, an inner cover 5b covering the said core 5a, a middle cover 5c covering the said inner cover 5b, and an outer cover 5d covering the said middle cover 5c, each of the siad core 5a and inner cover 5b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

16. Four-piece solid golf ball with a core 5a, an inner cover 5b covering the said core 5a, a middle cover 5c covering the said inner cover 5b, and an outer cover 5d covering the said middle cover 5c, each of the said core 5a, inner cover 5b and middle cover 5c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

17. Four-piece solid golf ball with a core 5a, an inner cover 5b covering the said core 5a, a middle cover 5c covering the said inner cover 5b, and an outer cover 5d covering the said middle cover 5c, the said inner cover 5b being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

18. Four-piece solid golf ball with a core 5a, an inner cover 5b covering the said core 5a, a middle cover 5c covering the said inner cover 5b, and an outer cover 5d covering the said middle cover 5c, each of the said inner cover 5b and middle cover 5c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

19. Four-piece solid golf ball with a core 5a, an inner cover 5b covering the said core 5a, a middle cover 5c covering the said inner cover 5b, and an outer cover 5d covering the said middle cover 5c, the said middle cover 5c being a mixture of base resins, α,β-ethylenical unsaturated carboxylic acid, and fatty acid bismuth salt, the said acid and salt being present initially in amounts of 3–25 and 5–50 parts by weight respectively per 100 parts by weight of the said base resins.

20. A multipiece solid golf ball having as components thereof an inner core and an outer cover covering said inner core, and optionally at least one component selected from the group consisting of (a) an outer core covering said inner core, (b) an outer layer intermediate said inner core and said outer cover, (c) an inner cover covered by said outer cover, and (d) when an inner cover is present, a middle cover intermediate said inner cover and said outer cover, at least one of said components other than said outer cover being a mixture of base resins, α,β-ethylenically unsaturated carboxylic acid, and fatty acid bismuth salt, said acid and said salt being present in amounts of 3–25 and 5–50 parts by weight, respectively, per hundred parts by weight of the said base resins.

* * * * *